United States Patent

Ellard et al.

[11] Patent Number: 5,989,427
[45] Date of Patent: Nov. 23, 1999

[54] METHOD OF DEGASSING BIOLOGICAL FILTERS

[75] Inventors: Gregory A. Ellard, Tampa, Fla.; Joseph M. Bonazza, Pittsburgh, Pa.; Miguel J. Merino, Tampa, Fla.

[73] Assignee: Tetra Technologies, Inc., Woodlands, Tex.

[21] Appl. No.: 08/895,621

[22] Filed: Jul. 17, 1997

[51] Int. Cl.$^6$ .......................................................... C02F 3/06
[52] U.S. Cl. ............................ 210/603; 210/618; 210/793; 210/150; 210/188; 210/275
[58] Field of Search .................................... 210/618, 603, 210/605, 620, 792, 793, 903, 188, 275, 279, 150, 151

[56] References Cited

U.S. PATENT DOCUMENTS

| | | |
|---|---|---|
| 409,970 | 8/1889 | Hyatt . |
| 3,709,364 | 1/1973 | Savage ...................................... 210/195 |
| 3,853,752 | 12/1974 | Tymoszczuk .............................. 210/17 |
| 3,970,555 | 7/1976 | Savage et al. ............................. 210/80 |
| 3,994,803 | 11/1976 | Neff et al. .................................... 210/8 |
| 4,159,945 | 7/1979 | Savage ......................................... 210/8 |
| 4,253,947 | 3/1981 | Fan et al. ................................. 210/618 |
| 4,793,934 | 12/1988 | Thompson et al. ...................... 210/793 |
| 5,288,398 | 2/1994 | Angelino ................................... 210/89 |
| 5,681,472 | 10/1997 | Jönsson et al. .......................... 210/618 |

*Primary Examiner*—Christopher Upton
*Attorney, Agent, or Firm*—Jo Katherine K'Ambrosio

[57] ABSTRACT

A method of degassing biological filters utilizing a backwash system wherein the steps of opening and closing valves are reduced, flow interruption through the filter is minimized, and the process of draining down a downflow filter is eliminated. A preferred method of degassing a plurality of downflow biological filters in a water treatment system comprises the steps of maintaining the influent flow throughout the degassing process, ceasing the effluent flow out of a filter selected to be degassed to prevent draining of the selected filter, introducing a backwash water flow into the bottom, and flushing of the filter until entrapped gases are released out of the filter. The backwash flow is then ceased and the effluent flow is recommenced to return the filter to service. The steps are successively repeated and the backwash pump remains on until all filters are degassed. The method of degassing a plurality of upflow biological filters comprises the steps of maintaining the effluent flow throughout the degassing of all filters, ceasing the influent flow into a bottom of a first filter to be degassed, introducing a backwash water flow into the bottom, flushing the filter until entrapped gases are released out of the filter, ceasing the backwash flow and recommencing influent flow to return it to service, and successively repeating the above steps to degas all other selected filters in the treatment system. The transition of the degassing process from one filter to another is seamless.

16 Claims, 2 Drawing Sheets

METHOD OF DEGASSING BIOLOGICAL FILTERS

FIELD OF THE INVENTION

The present invention relates to a method of degassing biological filters utilizing a backwash system. Particularly, the invention is directed to a method of degassing biological filters wherein the number of steps of opening and closing of valves is reduced, flow interruption throughout the filter is minimized and the process of draining down the filter is not required.

BACKGROUND OF THE INVENTION

Bioreactors used to treat wastewater produce a variety of gases as normal by-products of their operation. Typically, the primary gases produced by the microbial activity of a bioreactor are carbon dioxide and nitrogen. These gases are produced too rapidly in quantities too large to remain dissolved. Consequently, they form bubbles which become trapped in the filter media or packed bed filters of the bioreactor system.

As the quantity of gas trapped in the filter media or packed beds accumulates, water flow through the affected filters becomes increasingly restricted, and eventually adversely affects performance and efficiency of the overall wastewater treatment system. Therefore, it is necessary to periodically perform a degas procedure on the filter media or packed beds of the treatment system to remove trapped gas bubbles and solids from the filters in order to restore system performance and efficiency. It is desirable to accomplish this task as quickly as possible and with a minimum of disruption to the normal operation of the wastewater system.

The degassing of wastewater system filters is known in the art. A common degassing technique is to backwash or back-flush the filter media or packed bed with backwash water to dislodge and carry away the trapped gases.

Neff et al., U.S. Pat. No. 3,994,803 discloses an apparatus and method for denitrification of wastewater using a backwash reinnoculation technique. The invention comprises a container within the reactor for collecting a portion of the reactor water in a container and releasing the contained reactor water onto the filter bed when normal operation is resumed. Angelino, U.S. Pat. No. 5,288,398, discloses a backwash device and method which is automated for backwashing filter cells one at a time, wherein the backwash liquid when cleaning one cell is prevented from moving to a further cell until the operation is completed on the one cell. Savage, U.S. Pat. No. 4,159,945, discloses a method for denitrification of aqueous nitrate-containing solutions. The filter media comprises particles capable of entrapping bubbles of nitrogen gas generated by bacterial. The entrapped bubbles are removed by backwashing.

Although these techniques may be effective to different degrees in removing the trapped gases and restoring full system flow and filter capacity, they require at least the part of the wastewater system containing the filter to be degassed to be isolated in some manner from the rest of the treatment system during the degassing process. Typically, the degassing process is discretely accomplished, meaning that a single filter is isolated from the treatment system and the degassing process initiated and completed before a next filter is initiated into the process. Further, while a specific filter is removed from the system, remaining filters in the system have to handle the additional work load of the isolated element.

Savage et al., U.S. Pat. No. 3,970,555 disclose an apparatus and gas collection and venting system for removing gas bubbles from filter media. Gas bubble removal is accomplished or enhanced by an entrapped gas collecting means disposed within the filter bed and venting the collected gas bubbles to the atmosphere throughout a conduit means or venting pipe. Pressurized air or water is introduced into the lower portion of the filter bed to dislodge the gas bubbles from the filter media and drive them upward where they can be vented to the atmosphere. Tymoszezuk, U.S. Pat. No. 3,853,752 discloses a process of and apparatus for treating wastes by a combined activated sludge and biological filter that uses uplifting aeration for backwashing.

It would be desirable to have a degassing method available which accomplishes a full degassing of filters with the benefits of reducing the amount of time it takes to degas a specific filter or packed bed element, increasing the number of filters being degassed during a single degassing process and reducing wear and tear on system valves and equipment and not increasing the load on the other working filters of the treatment system while a selected filter is being degassed.

SUMMARY OF THE INVENTION

In one preferred method of this invention, the degassing of a downflow biological filter in a water treatment system having an influent flow into the freeboard of the filter, an effluent flow from the filter and a backwash system comprises the steps of ceasing the effluent flow to prevent draining of the filter; introducing a backwash water flow into the bottom of the filter to flush entrapped gases from the filter; continuing the flushing of the filter to release entrapped gases out of the filter; ceasing the backwash water flow and recommencing effluent flow to return the filter to service; and maintaining the influent flow throughout the degassing process.

In another preferred method, a plurality of downflow biological filters in a water treatment system having an influent flow into a freeboard of the filters, an effluent flow from the filters and a backwash system, are degassed. The method of degassing comprises the steps of (a) maintaining the influent flow into an inlet of each of the filters throughout the degassing of all filters selected for degassing; (b) ceasing the effluent flow out of a filter selected to be degassed to prevent draining of the selected filter; (c) introducing a backwash water flow into the bottom of the filter selected in step (b) to flush entrapped gases from the filter; (d) continuing flushing of the filter selected in step (b) until entrapped gases are released out of the filter; (e) ceasing the effluent flow out of a next selected filter and introducing the backwash flow into the next selected filter; (f) ceasing the backwash flow in the filter selected in step (b) and recommencing effluent flow out of the filter of step (b) to return the filter of step (b) to service; and (g) successively repeating steps (b) through (f) to degas other selected filters while continuing step (a); (h) flushing an ultimate next selected filter; (i) ceasing backwash flow to the ultimate next selected filter; and (j) recommencing effluent flow out of the ultimate next selected filter to return ultimate next selected filter to service.

In one aspect of this method, the operation of a backwash pump is maintained until all selected filters are flushed. In another aspect, the plurality of downflow biological filters are nitrification filters. Alternatively, the plurality of downflow biological filters can be denitrification filters, biological oxygen demand removal filters or chemical oxygen demand removal filters.

In a preferred embodiment of degassing an upflow biological filter in a water treatment system having an influent flow into a bottom of the filter, an effluent flow from the top of the filter and a backwash system, the method comprises the steps of (a) ceasing the influent flow into the bottom of the filter; (b) introducing a backwash water flow into the bottom of the filter to flush entrapped gases from the filter; (c) continuing the flushing of the filter to release entrapped gases out of the filter; (d) ceasing the backwash water flow and recommencing influent flow to return the filter to service; and (e) maintaining the effluent flow out of the top of the filter throughout steps (a) through (d).

In another preferred method of degassing a plurality of upflow biological filters in a water treatment system having an influent flow into the filters, an effluent flow from the filters and a backwash system, the method comprises the steps of (a) maintaining the effluent flow out of a top of each of the filters throughout the degassing of all filters selected for degassing; (b) ceasing the influent flow into a bottom of a filter selected to be degassed to prevent backwash backflow into other filters; (c) introducing a backwash water flow into the bottom of the filter selected in step (b) to flush entrapped gases from the filter; (d) continuing flushing of the filter selected in step (b) until entrapped gases are released out of the filter; (e) ceasing the influent flow into a bottom of a next selected filter to be degassed to prevent backwash backflow into other filters; (f) introducing a backwash water flow into the bottom of the next selected filter to flush entrapped gases from the filter; (g) ceasing the backwash flow in the filter selected in step (b) and recommencing influent flow into the bottom of the filter of step (b) to return the filter of step (b) to service; (h) successively repeating steps (b) through (g) to degas other selected filters while continuing step (a); (i) flushing an ultimate next selected filter; (j ceasing backwash flow to the ultimate next selected filter; and (k) recommencing influent flow into the bottom of ultimate next selected filter to return ultimate next selected filter to service.

In one aspect of this method of degassing upflow biological filters, the operation of a backwash pump is maintained to flush each filter. In another aspect of this method the plurality of upflow biological filters include but are not limited to nitrification filters, denitrification filters, chemical oxygen demand removal filters, and biological oxygen demand removal filters.

In another preferred method of degassing a plurality of downflow biological filters in a water treatment system having an influent flow into a freeboard of the filters, an effluent flow from the filters and a backwash system, the method comprises the steps of: (a) closing the effluent valve from a first filter selected for degassing to prevent draining of the filter; (b) opening the clean backwash water valve of the first selected filter; (c) starting a backwash pump; (d) flushing the first selected filter to release entrapped gases out of the filter; (e) closing the effluent valve from a next selected filter, and opening the clean backwash water valve to the next selected filter; (f) closing the clean backwash water valve to the first selected filter; (g) opening the effluent valve from the first selected filter; (h) successively repeating steps (d) through (g) for each additional filter wherein the next successive filter in a previous sequence of steps (d) through (g) become the first selected filter in the next sequence of successive steps (d) through (g); (i) flushing an ultimate next selected filter; (j) turning off the backwash water pump; (k) opening the effluent valve from the ultimate next selected filter; (l); closing the clean backwash water valve to the ultimate next selected filter; and (m) maintaining an influent valve in an open position through steps (a) through (l).

A preferred embodiment of the method of degassing a plurality of upflow biological filters in a water treatment system having an influent flow into the filters, an effluent flow from the filters and a backwash system, the method comprises the steps of: (a) closing an influent valve from a first filter selected for degassing to prevent draining of the filter; (b) opening an clean backwash water valve of the first selected filter; (c) starting a backwash pump; (d) flushing the filter selected in step (b) until entrapped gases are released out of the filter; (e) closing the influent valve from a next selected filter, and opening the clean backwash water valve to the next selected filter; (f) closing the clean backwash water valve to the first selected filter; (g) opening the influent valve from the first selected filter; (h) repeating steps (d) through (g) for each additional filter; (l) flushing an ultimate next selected filter; (j) turning off the backwash water pump; (k) opening the influent valve from the ultimate next selected filter; (l) closing the clean backwash water valve to the ultimate next selected filter; and (m) maintaining an effluent valve in an open position throughout steps (a) to (l).

BRIEF DESCRIPTION OF THE DRAWINGS

The FIG. 1 is an elevation of a typical downflow biological filter of a water treatment system.

DETAILED DESCRIPTION OF THE INVENTION

Degassing a biological filter comprises a series of sequential steps that produce a backwash flow to purge the filter media of gas. Microbes are used to remove pollutants contained in wastewater. Gas is produced as a result of microbiological activity within the filter media such as respiration and denitrification. The resulting gases restrict water flow and affect treatment efficiency if not purged regularly. In one embodiment of the method of this invention, the filter is a downflow filter. An advantage of this method is that the filter is not drained down and the influent valve is not closed during the degassing process. Eliminating drain down of the filter reduces the overall time for degassing procedures and improves efficiency of the filter operation with little or no disruption to other filters in the system. The filter being degassed is off-line for a shorter period of time and there is less wear and tear on the pumps and valves.

In an alternate embodiment of degassing biological filters, the filter is an upflow filter. The effluent flow continues throughout the degassing process so that no water is returned to the upstream systems for reprocessing thereby improving filter efficiency.

Figure 1:
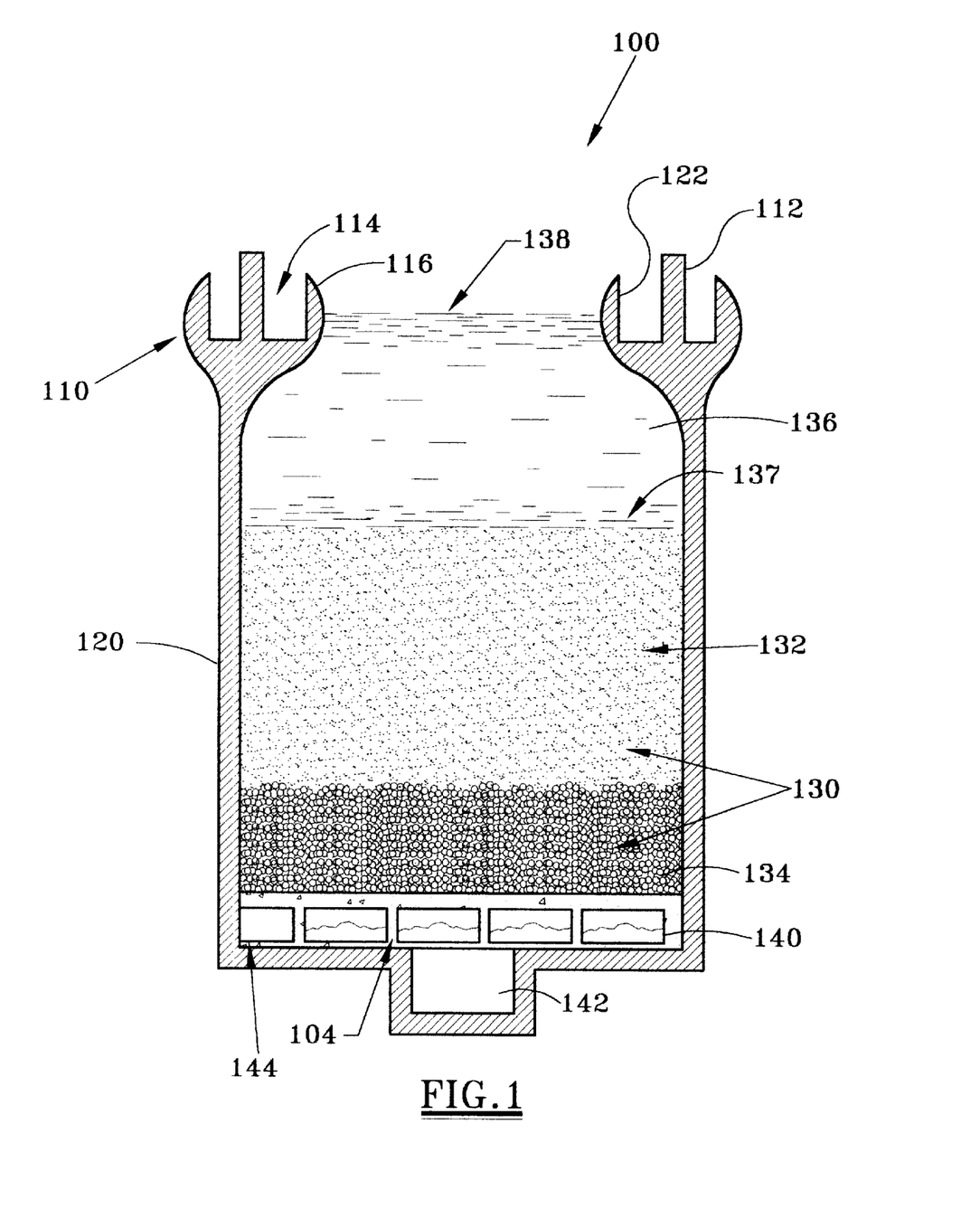

Referring now to the drawing, the Figure illustrates a downflow biological filter 100. A preferred water treatment system can have from two to ten filters 100 in parallel. Preferably, the filters 100 share a common wall 120. During filtration, influent wastewater is piped into troughs 114 formed in the top of the filter wall 122 and spills over weirs 116 onto the filter media 130. The troughs 114 are connected to an influent header (not shown). During the filtration process, the influent is filtered through the filter media 130 which can be comprised of sand and gravel. In one preferred embodiment, the filter media is comprised of a layer of sand 132, approximately six feet deep. The sand 132 lies on approximately eighteen inches of gravel 134, which, in turn, is supported by underdrain blocks 140. Filtered effluent is collected in a sump 142 and flows from the filter 100 to a clearwell (not shown) which acts as a reservoir to supply clean backwash water to the filter 100. Excess water is directed to a discharge location.

In biological filters, microbe activity is often enhanced by feeding a supplemental carbon source, such as, for example, methyl alcohol (methanol) into the water entering the filter 100. As the wastewater filters down through the filter media 130, the biological activity of microorganisms produces gases which must be removed. The removal of the gases produced during filtration is often referred to as degassing. A gas release from a biological filter can be violent enough to break active biomass loose from the filter media 130 near the top of the filter bed. This biological material will be suspended in water above the filter media 130. It is beneficial that the biomass which is suspended in the water collected above the filter media and methanol within the water not be lost with the discharge of the effluent during the degassing process.

Another benefit of this invention's new method of degassing is the decrease in fluctuation of flow rates in the filters. Biomass growth in the filter adjusts to the average flow rate through the filter over time. If this flow rate is exceeded temporarily, efficiency is reduced. Similarly, filtration efficiency can be adversely affected by sudden increases in flow rate. Solids deposition in the filter media which has occurred at a lower flow rate may be upset and stripped out if the flow rate is suddenly raised. For example, if three filters are on line, processing equal amounts of water, and one is taken off-line with the influent diverted to the other filters remaining in service, the other two filters will have an immediate fifty percent increase in flow. This diversion of flow to the other filters often lasts long enough to require longer drain down times in those filters, again disrupting the biological activity and increasing down time for the entire filter system. In a preferred method of degassing filters according to the present invention, the filter selected to be degassed is not drained down since the influent valve is left open and the effluent valve is closed. As a result, there is a more uniform flow to other filters not being degassed; thereby reducing disruption to biological processes and filtration processes.

In the preferred method of degassing a downflow filter, a filter is selected for degassing. The selected filter has freeboard 136 above the filter water level, preferably six to eight feet. The effluent valve is closed so that no drain down occurs. The influent valve remains open and influent, piped into troughs 114 at the top of the filter wall 120, continues to flow into the filter 100 throughout the degassing process. A backwash pump charges a backwash water flow into a channel or sump 142 that extends the length of the filter bottom 104. The preferred backwash water is filtered, unchlorinated water that is stored in the clearwell (not shown). Closing the effluent valve also prevents the short circuit of backwash into the clearwell since the backwash water uses the same path as the effluent flow between the clearwell and the filter.

During filtration, downflow filtrate collects in the channel 142 and flows to the clearwell. During filter backwashing, however, backwash water is pumped into the channel 142 from the clearwell and is evenly distributed upward across the area of the filter media 130. The backwash flow flushes out gases trapped between the particles of sand 132 and gravel 134 and carries these gases out to the atmosphere above the water level 137, 138 of the filtrate. Preferably, a freeboard 136 above the lower water level 137 is maintained so that the combined in-flows of influent and backwash water do not overflow the weir 116. A preferred freeboard height is from six to eight feet. With this preferred method of backwashing, any biomass suspended during the gas release remains in the filter 100 as does any additives to the filtrate, such as methanol. If the backwash flow does cause the maximum water level 138 to rise above the distribution weir 116, the surcharge will enter the influent piping and be directed to other filters 100 so as not to be lost from the system.

In a preferred method of degassing biological filters 100 in a water treatment system, a plurality of downflow filters 100 are selected for sequential degassing. In this preferred method, the influent flow into the inlet of each of the filters is maintained during the degassing process. The influent valve remains opened. The effluent valve of the first filter selected for degassing is closed so that the effluent flow ceases, thereby preventing drain down of that filter and short circuiting of the backwash water into the effluent flow. The backwash valve is opened and a backwash pump turned on so that a backwash flow is pumped into the channel of the first selected filter. The backwash flow flushes out gases entrapped in the filter media until the gases are released into the atmosphere above the water level. The effluent valve of the second filter selected for degassing is closed and effluent flow ceases in that filter. The backwash valve to the second selected filter is opened. The backwash valve to the first selected filter closed and the effluent valve to the first selected filter is then opened. Effluent flow resumes in the first selected filter, backwash flow stops in the first selected filter and starts in the second selected filter. These steps are repeated with each additional filter until all filters selected for degassing are backwashed. The backwash pump remains turned on until all selected filters are degassed. By careful sequencing of valve movements, and elimination of the drain down step, the time required for degassing is reduced, the number of valve movements is also reduced and the impact on the biomass within the filter media is minimized, thereby enhancing the overall operation efficiency of the filters. The following example is a comparison of the typical steps and time required to complete each step for the prior art method of degassing as compared with a preferred method of degassing for this invention:

EXAMPLES OF DEGASSING DOWNFLOW FILTERS

| Prior art degassing method steps | Time (Minutes) |
| --- | --- |
| 1. Close influent valve | 0.5 |
| 2. Drain down filter | 5.0 |
| 3. Close effluent valve | 0.5 |
| 4. Open clean backwash water valve; if filter water level high, open dirty backwash drain valve | 0.5 |
| 5. Start backwash water pump | 0.5 |
| 6. Continue flushing | 1.0 |
| 7. Turn off backwash water pump, close clean backwash water valve, and close dirty backwash water valve if opened. | 0.5 |
| 8. Open effluent valve | 2.0 |
| 9. Open influent valve | 0.5 |
| TOTAL TIME | 11.0 |

The above sequence for the prior art method of degassing a biological filter must be repeated for each filter to be degassed. If five filters are degassed in one degassing process or sequence, the total time for the degassing process is 55 minutes.

The above prior art method was performed on a filter system using fast acting air-operated valves. If slow moving electrical valves are employed, several additional minutes would be required. All operations are completed on the filter selected for degassing before degassing of the next filter.

| New degassing method | Minutes |
| --- | --- |
| 1. Close effluent valve, open clean backwash water valve of first selected filter | 0.5 |
| 2. Start backwash water pump | 0.5 |
| 3. Continue flushing | 1.0 |
| 4. Close effluent valve and open clean backwash water valve of next selected filter | 0.5 |
| 5. Open effluent valve and close clean backwash water valve of first selected filter | 0.5 |
| 6. Flush next selected filter | 1.0 |
| 7. Repeat steps 4, 5, and 6 for each additional selected filter | 2.0 |
| 8. Turn off backwash pump, open effluent valve and close clean backwash water valve of last selected filter. | 0.5 |

The total time to degas one filter is approximately 2.0 minutes, essentially the time it takes for steps 4, 5 and 6. An additional 1.0 minute is required to turn the backwash pump on and off. If five filters are degassed during a degassing sequence, the total degassing time is 11 minutes.

In the method of degassing of this invention, the backwash pump remains on until all filters are degassed thereby decreasing overall time of operation as well as wear and tear on equipment. The step times may vary depending on the type of equipment used for the valve systems.

The key differences between the method of the present invention and the prior art method of degassing are that in the method of this invention: 1) the influent valve is not closed; 2) the filter is not drained down, nor is it necessary or desirable to lower the filter water level before degassing; 3) the backwash pump remains on until all filters are degassed; 4) no filter's dirty backwash valve (if present) is opened because of high water level unless all other filters in the system also have high water levels. One key factor to having a seamless transition in this invention's degassing method is the step of preparing the filter for degassing, i.e., closing the effluent valve and opening the clean backwash water valve, is begun before the final step in degassing the previously selected filter, i.e. opening the effluent valve and closing the clean backwash water valve.

This new degassing method allows flow rates to filters in the system that are not being degassed to remain at steady state conditions so that biological equilibria are not disturbed. Because the time for degassing a sequence of filters is reduced, more filters can be degassed in a single degassing process.

Figure 2:
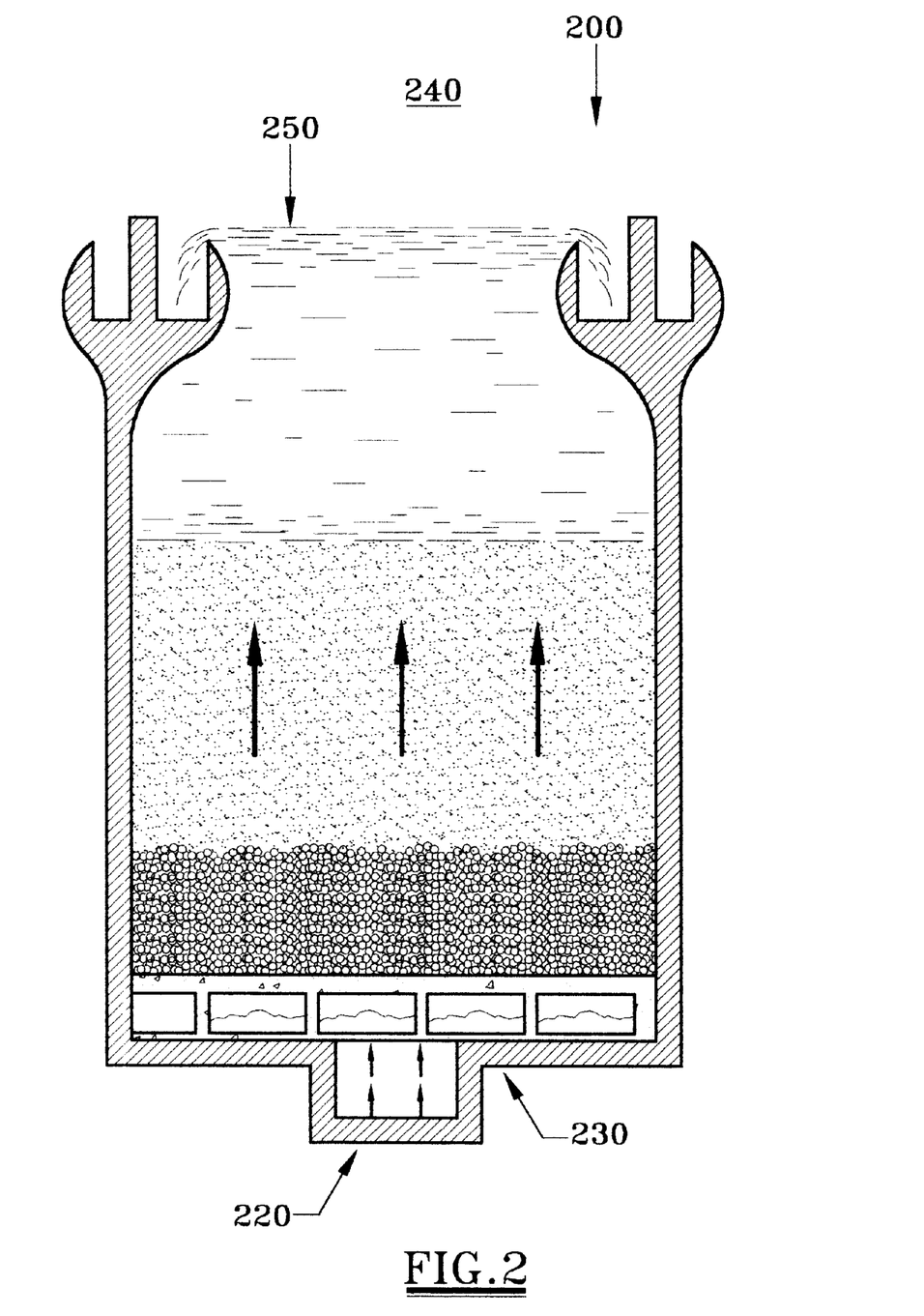
FIG. 2 is an elevation of a typical upflow filter of a water treatment system during the degassing method.

As illustrated in FIG. 2, in a degassing method for a single upflow filter 200, the influent flow is introduced in the bottom 230 of the filter so that the upward air flow does not oppose a downward influent flow. In a preferred method of degassing an upflow filter, the influent valve is closed and influent flow into the bottom 230 of the filter is stopped. Backwash water flow 220 is introduced into the bottom 230 of the filter to flush trapped gases and the flushing is continued until the gases are released into the atmosphere 240. The backwash water flow is then stopped and the influent flow recommenced to return the filter back to service. The effluent flow 250 continues to flow out of the top of the filter. When degassing a plurality of upflow filters, the backwash pump remains on until all filters selected for degassing are processed. The effluent valve is never closed and the dirty backwash valve is not opened. The transition of the degassing process from one filter to another is seamless.

EXAMPLES OF DEGASSING UPFLOW FILTERS

The following is a comparison of the typical steps and time required to complete each step for the prior art method of degassing an upflow filter as compared with a preferred method of degassing upflow filters of this invention:

| Prior art degassing method steps. | Time (Minutes) |
| --- | --- |
| 1. Close influent valve, close effluent valve | 0.5 |
| 2. Open clean backwash water valve, open dirty backwash drain valve | 0.5 |
| 3. Start backwash water pump | 0.5 |
| 4. Continue flushing | 1.0 |
| 5. Turn off backwash water pump, close clean backwash water valve | 0.5 |
| 6. Close dirty backwash water valve, open effluent valve | 0.5 |
| 7. Open influent valve | 0.5 |
| TOTAL TIME | 4.0 |

| New degassing method. | Minutes |
| --- | --- |
| 1. Close influent valve, open clean backwash water valve of first selected filter | 0.5 |
| 2. Start backwash water pump | 0.5 |
| 3. Continue flushing | 1.0 |
| 4. Close influent valve and open clean backwash water valve of next selected filter | 0.5 |
| 5. Open influent valve and close clean backwash water valve of first selected filter | 0.5 |
| 6. Flush next selected filter | 1.0 |
| 7. Repeat steps 4, 5, and 6 for each additional filter | |
| 8. Turn off backwash water pump, open effluent valve and close clean backwash water valve of last selected filter | 0.5 |

Steps 4, 5, and 6 are repeated for each upflow filter selected for degassing. Total time to degas each filter is approximately 2.0 minutes. One key factor to having a seamless transition in the degassing method is the step of preparing the filter for degassing, i.e., closing the influent valve and opening the clean backwash water valve, is begun before the final step in degassing the previously selected filter, i.e. opening the influent valve and closing the clean backwash water valve.

An additional 1.0 minute is required to turn the backwash pump on and off. The total time for degassing five filters is approximately 11 minutes as compared to 20 minutes using the prior art method.

As in a downflow filter, the backwash pump remains on until all filters selected for degassing are degassed thereby decreasing overall time of operation as well as wear and tear on equipment. The step times may vary depending on the type of equipment used for the valve systems. In an upflow filter the influent and clean backwash are introduced at the same point. Therefore it is necessary to stop the influent flow when starting the clean backwash water flow. While one filter of a system is off-line, for degassing, the other filters must take the extra flow.

Effluent flow in upflow filter systems is usually lower than the required backwash flow. Effluent can be stored in a clearwell tank so that it may be available for backwashing or degassing using backwash pumps. Excess water overflows the clearwell where it travels to the next treatment process. Prior art degassing of upflow filters involved opening dirty backwash water valves so that water displaced during the degassing would overflow to a mudwall and then back to upstream systems for reprocessing. This required a repumping and retreatment cost, and reduced maximum capacity of the treatment system since some fraction was always a recycle stream within the system. In the preferred degassing method of this invention, the effluent valve is not closed and water overflowing during the degassing is immediately returned to the clearwell. No reprocessing or repumping is required.

Since biological reactions in an upflow filter are time dependent and adjust to average flow conditions, the temporary rise in flow can reduce treatment activity. Reducing the time period that flow is diverted to other filters not being degassed reduces disruption to biological processes and filtration processes. The preferred method of degassing upflow filters reduces valve movements to a minimum so that the degassing process is executed faster. Biological filters are typically required to be degassed four to eight times per day. Careful sequencing of valve movements reduces recycle flow. Less variation in filter flow increases treatment capacity and efficiency.

The method of degassing biological filters of the present invention is applicable to various filter processes in which large amounts of gases are produced including but not limited to nitrification filters, denitrification filters, chemical oxygen demand (COD) removal filters and biological oxygen demand (BOD) removal filters.

The foregoing description is illustrative and explanatory of preferred embodiments of the invention, and variations in the size, shape, materials and other details will become apparent to those skilled in the art. It is intended that all such variations and modifications which fall within the scope or spirit of the appended claims be embraced thereby.

We claim:

1. A method of degassing a downflow biological filter in a water treatment system having an influent flow into the freeboard of the filter, an effluent flow from the filter and a backwash system, the method comprising the steps of:
   (a) ceasing the effluent flow to prevent draining of the filter;
   (b) introducing a backwash water flow into the bottom of the filter to flush entrapped gases from the filter;
   (c) continuing the flushing of the filter to release entrapped gases out of the filter without overflow of water over a weir;
   (d) ceasing the backwash water flow and recommencing effluent flow to return the filter to service; and
   (e) maintaining the influent flow throughout steps (a) through (d).

2. A method of degassing a plurality of downflow biological filters in a water treatment system having an influent flow into a freeboard of the filters, an effluent flow from the filters and a backwash system, the method comprising the steps of:
   (a) maintaining the influent flow into an inlet of each of the filters throughout the degassing of all filters selected for degassing;
   (b) ceasing the effluent flow out of a filter selected to be degassed to prevent draining of the selected filter;
   (c) introducing a backwash water flow into the bottom of the filter selected in step (b) to flush entrapped gases from the filter;
   (d) continuing flushing of the filter selected in step (b) until entrapped gases are released out of the filter;
   (e) ceasing the effluent flow out of a next selected filter and introducing the backwash flow into the next selected filter;
   (f) ceasing the backwash flow in the filter selected in step (b) and recommencing effluent flow out of the filter of step (b) to return the filter of step (b) to service; and
   (g) successively repeating steps (b) through (f) to degas other selected filters while continuing step (a);
   (h) flushing an ultimate next selected filter;
   (i) ceasing backwash flow to ultimate next selected filter; and
   (j) recommencing effluent flow out of the ultimate next selected filter to return ultimate next selected filter to service.

3. The method of claim 2 wherein the operation of a backwash pump is maintained until all selected filters are flushed.

4. The method of claim 2 wherein the plurality of downflow biological filters are nitrification filters.

5. The method of claim 2 wherein the plurality of downflow biological filters are denitrification filters.

6. The method of claim 2 wherein the plurality of downflow biological filters are biological oxygen demand removal filters.

7. The method of claim 2 wherein the plurality of downflow biological filters are chemical oxygen demand removal filters.

8. A method of degassing an upflow biological filter in a water treatment system, the system having an influent flow into a bottom of the filter, an effluent flow from the top of the filter and a backwash system that does not remove biomass solids from the filter during the degassing, the method comprising the steps of:
   (a) ceasing the influent flow into the bottom of the filter;
   (b) introducing a backwash water flow into the bottom of the filter to flush entrapped gases from the filter;
   (c) continuing the flushing of the filter to release entrapped gases out of the filter;
   (d) ceasing the backwash water flow and recommencing influent flow to return the filter to service; and
   (e) maintaining the effluent flow out of the top of the filter throughout steps (a) through (d).

9. A method of degassing a plurality of upflow biological filters in a water treatment system having an influent flow into the filters, an effluent flow from the filters and a backwash system, the method comprising the steps of:
   (a) maintaining the effluent flow out of a top of each of the filters throughout the degassing of all filters selected for degassing;
   (b) ceasing the influent flow into a bottom of a filter selected to be degassed to prevent backwash backflow into other filters;
   (c) introducing a backwash water flow into the bottom of the filter selected in step (b) to flush entrapped gases from the filter;
   (d) continuing flushing of the filter selected in step (b) until entrapped gases are released out of the filter;
   (e) ceasing the influent flow into a bottom of a next selected filter to be degassed to prevent backwash backflow into other filters;
   (f) introducing a backwash water flow into the bottom of the next selected filter to flush entrapped gases from the filter;
   (g) ceasing the backwash flow in the filter selected in step (b) and recommencing influent flow into the bottom of the filter of step (b) to return the filter of step (b) to service;
   (h) successively repeating steps (b) through (g) to degas other selected filters while continuing step (a);
   (i) flushing an ultimate next selected filter;

(j) ceasing backwash flow to ultimate next selected filter; and (k) recommencing influent flow into the bottom of ultimate next selected filter to return ultimate next selected filter to service.

10. The method of claim 9 wherein the operation of a backwash pump is maintained to flush each filter.

11. The method of claim 9 wherein the plurality of upflow biological filters are nitrification filters.

12. The method of claim 9 wherein the plurality of upflow biological filters are denitrification filters.

13. The method of claim 9 wherein the plurality of upflow biological filters are chemical oxygen demand removal filters.

14. The method of claim 9 wherein the plurality of upflow biological filters are biological oxygen demand removal filters.

15. A method of degassing a plurality of downflow biological filters in a water treatment system having an influent flow into a freeboard of the filters, an effluent flow from the filters and a backwash system, the method comprising the steps of:

(a) closing an effluent valve from a first filter selected for degassing to prevent draining of the filter;

(b) opening a clean backwash water valve of the first selected filter;

(c) starting a backwash pump;

(d) flushing the first selected filter to release entrapped gases out of the filter;

(e) closing the effluent valve from a next selected filter, and opening the clean backwash water valve to the next selected filter;

(f) closing the clean backwash water valve to the first selected filter;

(g) opening the effluent valve from the first selected filter;

(h) successively repeating steps (d) through (g) for each additional filter wherein the next successive filter in a previous sequence of steps (d) through (g) become the first selected filter in the next sequence of successive steps (d) through (g);

(i) flushing an ultimate next selected filter;

(j) turning off the backwash water pump;

(k) opening the effluent valve from the ultimate next selected filter;

(l) closing the clean backwash water valve to the ultimate next selected filter; and (m) maintaining an influent valve in an open position through steps (a) through (l).

16. A method of degassing a plurality of upflow biological filters in a water treatment system having an influent flow into the filters, an effluent flow from the filters and a backwash system, the method comprising the steps of:

(a) closing the influent valve from a first filter selected for degassing to prevent draining of the filter;

(b) opening the clean backwash water valve of the first selected filter;

(c) starting a backwash pump;

(d) flushing the filter selected in step (b) until entrapped gases are released out of the filter;

(e) closing the influent valve from a next selected filter, and opening the clean backwash water valve to the next selected filter;

(f) closing the clean backwash water valve to the first selected filter;

(g) opening the influent valve from the first selected filter;

(h) repeating steps (d) through (g) for each additional filter;

(i) flushing an ultimate next selected filter;

(j) turning off the backwash water pump;

(k) opening the influent valve from the ultimate next selected filter;

(l) closing the clean backwash water valve to the ultimate next selected filter; and (m) maintaining an effluent valve in an open position throughout steps (a) to (l).

* * * * *

UNITED STATES PATENT AND TRADEMARK OFFICE
CERTIFICATE OF CORRECTION

PATENT NO : 5,989,427
DATED : Nov. 23, 1999
INVENTOR(S) : Ellard et al.

It is certified that error appears in the above-identified patent and that said Letters Patent are hereby corrected as shown below:

In the designation of Attorney, Agent, or Firm,
"Jo Katherine K'Ambrosio" should read "Jo Katherine D'Ambrosio".

In the Summary of the Invention,
At col. 3, line 33, "(j ceasing" should read "(j) ceasing".
At col. 4, line 7, "opening an clean" should read "opening the clean".

Signed and Sealed this

Twenty-seventh Day of June, 2000

Attest:

Q. TODD DICKINSON

Attesting Officer

Director of Patents and Trademarks

UNITED STATES PATENT AND TRADEMARK OFFICE
CERTIFICATE OF CORRECTION

| | |
|---|---|
| PATENT NO. | : 5,989,427 |
| DATED | : November 23, 1999 |
| INVENTOR(S) | : Gregory A. Ellard, Joseph M. Bonazza and Miguel J. Merino |

It is certified that error appears in the above-identified patent and that said Letters Patent is hereby corrected as shown below:

<u>Title page,</u>
Item [74], *Attorney, Agent, or Firm*, reads "Jo Katherine K'Ambrosio" should read -- Jo Katherine D'Ambrosio --

Signed and Sealed this

Ninth Day of November, 2004

JON W. DUDAS
*Director of the United States Patent and Trademark Office*